United States Patent [19]

Slocum

[11] 4,100,468
[45] Jul. 11, 1978

[54] ELECTRIC MOTOR CONTROL AND METHOD

[75] Inventor: Charles W. Slocum, Spring Lake Heights, N.J.

[73] Assignee: Sealed Unit Parts Co., Inc., Allenwood, N.J.

[21] Appl. No.: 784,285

[22] Filed: Apr. 4, 1977

[51] Int. Cl.² ............................................... H02P 1/44
[52] U.S. Cl. ................................. 318/221 C; 318/229; 361/105
[58] Field of Search ............ 318/221 R, 221 C, 221 H, 318/228, 229, 472, 473; 361/105, 106

[56] References Cited

U.S. PATENT DOCUMENTS

| 2,618,721 | 11/1952 | Clark | 318/221 C |
| 2,624,030 | 12/1952 | Swan | 318/221 C |
| 3,965,392 | 6/1976 | Moorhead et al. | 318/221 H |

FOREIGN PATENT DOCUMENTS 2,342,015   3/1975   Fed. Rep. of Germany ... 318/221 C

*Primary Examiner*—Gene Z. Rubinson
*Attorney, Agent, or Firm*—Gust, Irish, Jeffers & Rickert

[57] ABSTRACT

An electric motor control circuit, especially for a split phase motor, in which a positive temperature coefficient resistor is interposed in the starting winding circuit to substantially remove the starting winding from the circuit after the motor has started while a temperature sensitive switch is provided in series with the motor to deenergize the motor when it is overloaded. The positive temperature coefficient resistor element has a temperature sensitive element associated therewith which prevents the temperature sensitive switch from activating to a closed position from an open position whenever the resistor element is above a predetermined temperature.

16 Claims, 7 Drawing Figures

ELECTRIC MOTOR CONTROL AND METHOD

BACKGROUND OF THE INVENTION

1. Field of the Invention

The present invention relates to electric motor control circuits and is particularly concerned with a control circuit for split phase electric motors.

2. Description of the Prior Art

Split phase electric motors, as is known, comprise, in addition to the rotor winding, starting and running windings. The starting and running windings have respective impedances and when both are energized, a rotating field condition is simulated which causes the stationary rotor to commence rotating. When the rotor approaches the rated speed of the motor, which is determined by the number of poles in the stator, the starting winding is effectively deenergized by means of centrifugal or magnetic switch means or the like.

According to the present invention, and as disclosed in my prior U.S. Pat. Nos. 3,924,222 and 3,925,748, a positive temperature coefficient resistor element can be interposed in the starting winding circuit and the starting winding can be made substantially ineffective due to the increase in resistance of the resistor element referred to above when it becomes heated. The ratio of resistance of the resistor element between cold and heated conditions is substantial so that the current through the starting winding can be reduced to the point that no substantial loss of energy occurs due to the starting winding current.

It is quite often the case that motors of the nature referred to are protected by a temperature sensitive switch in series with the motor which is normally closed and which is actuated into open position under conditions of motor operation which would be damaging to the motor. An overload condition, or a condition in which the rotor was prevented from turning when the motor was energized, could lead to overheating of the motor and damaging of the windings thereof.

Under such circumstances, he current supply to the motor increases and a switch which is sensitive to excessive motor current can be provided in series with the motor and will respond to overload conditions and interrupt the supply of energy to the motor. In general, a switch of this nature can be made temperature sensitive by causing the motor current to pass through a bimetallic element or the like which, when raised to a certain temperature, will cause the switch to open.

Such a switch adequately protects the motor with which it is in circuit from damage due to overload and which positive temperature coefficient resistor referred to above forms an effective control for use in respect of cutting out the starting winding at the proper time, but conditions can arise in which the overload switch and the load responsive switch do not cooperate in the desired manner and the compromises which must be effected to make the switch arrangement work reliably detract from the efficiency thereof.

By way of example, if the resistor element is made of substantial size so as to have adequate current carrying capacity and to control the heating rate thereof, it is sometimes the case that this element will cool down only rather slowly. If it occurs that the overload switch were to open, then the possibility presents itself that the overload switch could close before the resistor element had cooled sufficiently to permit an adequate current supply to the starting winding. The overload switch, under such circumstances, could easily be triggered into open condition again. The described cycle could be repeated indefinitely without the motor starting under certain conditions.

An attempt to place the motor element and a temperature responsive overload switch in heat exchange relation proved to be unsatisfactory because ambient temperature could interfere with the operation, especially, of the overload switch.

The separating of the resistor element and the thermally operated overload switch resulted, as mentioned above, in compromising in order to obtain reliable operating conditions.

It has been discovered, as a result of tests and experimentation, that the problems heretofore encountered in respect of motor control circuitry of the aforementioned type can be made to operate in a highly satisfactory and reliable manner by the provision of a mechanical interlock between the high temperature coefficient resistor and the overload switch which prevents the overload switch from moving from an open to a closed position until the high temperature coefficient resistor element has cooled down to a predetermined temperature suitable for starting of the motor.

A primary object of the present invention is the provision of an improved motor control circuit and method especially adapted for use with a split phase electric motor.

Another object is the provision of a motor control circuit for a split phase motor having a high temperature coefficient resistor in the starting winding circuit and an overload switch in series with the motor with a mechanical link provided between the high temperature coefficient resistor and the overload switch.

A particular object of the present invention is the provision of a motor control circuit for a split phase motor having a high temperature coefficient resistor element in the starting phase circuit and an overload switch in series with the motor in which the overload switch after opening is prevented from closing until the positive temperature coefficient resistor element has cooled to a predetermined temperature.

SUMMARY OF THE INVENTION

According to the present invention, a split phase motor having starting and running windings has an overload switch in series therewith which opens to interrupt the supply of current to the motor whenever the operating conditions of the motor become such that the motor could be damaged.

Such operating conditions substantially always involve an increase in motor current, and for this reason, the overload switch is usually made temperature sensitive and the current supply to the motor provides the energy for elevating the temperature of the heat sensitive portion of the switch. Thus, for a predetermined current to the motor, the switch will open and interrupt the current supply.

Motors of the nature referred to often embody a positive temperature coefficient resistor element in the starting winding circuit which heats up due to the current to the starting winding and so increases in resistance that, after a period of time, ample for starting the motor, the current through the starting winding is diminished to a fraction of the current passing therethrough at the instant of starting the motor.

In order to integrate the operation of the overload switch and the positive temperature coefficient resistor element so that the overload switch, after opening, will only close when the high temperature coefficient resistor element has cooled down, a mechanical element operated by the heat of the resistor element is provided which blocks the closing of the overload switch until the resistor element cools down.

The mechanical element advantageously takes the form of a bimetal device in heat exchange relation with the resistor element and a link or member moved thereby which will block movement of a contact carrying portion of the overload switch from contact open to contact closed position.

The portion of the link or member which moves into blocking relation with the contact carrying portion of the overload switch may be connected with the aforementioned bimetallic actuator by spring means so that, when the overload switch is in closed position and the positive temperature coefficient resistor element heats up, the blocking member will not bear against the movable portion of the overload switch with sufficient force to interfere with the operation thereof.

The above-mentioned and other features and objects of this invention and the manner of attaining them will become more apparent and the invention itself will be best understood by reference to the following description of an embodiment of the invention taken in conjunction with the following drawings.

DESCRIPTION OF THE PREFERRED EMBODIMENT

Figure 1:
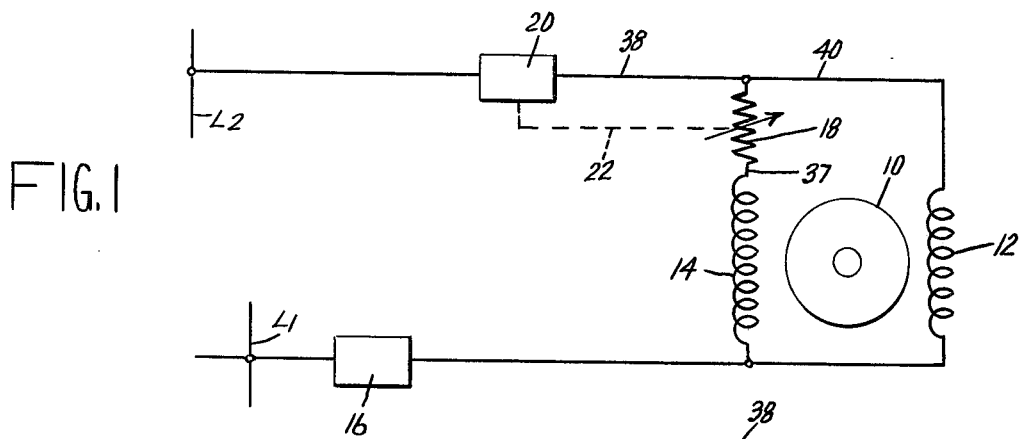
FIG. 1 schematically represents a split phase motor with a control circuit according to the present invention incorporated therein.

Referring to the drawings somewhat more in detail, in FIG. 1, 10 indicates the rotor of a split phase electric motor having a running winding 12 and a starting winding 14. The motor is connected between supply lines L1 and L2 and control switching is provided at 16 for opening and closing the connection to the adjacent one of lines L1 and L2. The component indicated schematically at 16 may be a mechanical switch, but it is more often control circuitry, such as might be found, for example, in a refrigerator having a split phase drive motor.

In series with starting winding 14 is a resistor element 18 characterized in having an extremely high positive temperature coefficient. A resistor element of this nature is disclosed in my prior U.S. Pat. No. 3,925,748 and is characterized in that the resistance of the element increases several orders of magnitude between room temperature of the element and the temperature which the element reaches due to electric current flow therethrough.

Thus, when the motor is started, there is ample current flow through starting winding 14 to cause the motor to come up to speed sharply but, as the resistor element 18 increases in temperature, the current through starting winding 14 will diminish to a negligible amount and, by which time, the rotor is up to speed and is being driven by the running winding 12.

In series with the motor is an overload switch 20 which, in particular, detects excessive current supply to the motor and interrupts the current supply thereto. Such a switch is advantageously operated by a bimetallic strip which conducts the motor current and which, under extreme conditions of motor operation, will become sufficiently heated to open the switch and interrupt current supply to the motor.

With the current supply thus interrupted, the overload switch 20 gradually cools off and closes. It is possible, of course, to make switch 20 of the type which opens and remains open until reset, but in the case of an appliance such as a refrigerator or the like, and in many other cases, it is desired for switch 20 to close when it cools so that the motor will restart automatically.

According to the present invention, a link or bar schematically indicated at 22 is provided between resistor element 18 and switch 20 so that, once switch 20 opens, it will not again close until resistor element 18 has cooled to a predetermined temperature.

The overload switch comprises a flat snap-action bimetal strip 24 having an end fixedly supported at 26 on supporting frame 25 with the other end movable carrying a contact element 28 normally closing on a stationary contact element 30 connected to the wire 32 supplying current to the electric motor. Bimetal 24 has a transverse "V" indentation 24' to provide for snap-action thereof upon heating and cooling. The overload switch may be of another type, so long as it controls the opening and closing of motor current carying contacts.

Figure 2:
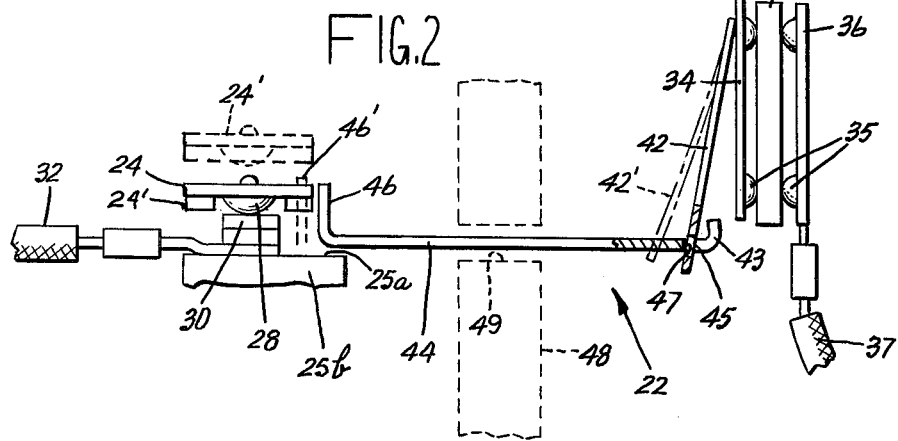
FIG. 2 is a schematic view showing more in detail the motor control circuitry according to the present invention.

The disc-shaped, high positive temperature coefficient resistor element will be seen in FIG. 2 to be resiliently clamped between respective disc-shaped contactors or conductive elements 34 and 36 with element 36 connected to starting winding 14 by lead 37 while element 34 is connected to the stationary end of bimetal 24 by wire 38. The same end 26 of bimetal 24 is connected to one end of running winding 12 by wire 40. The conductive elements 34 and 36 are identical, each having three spaced contact bosses 35 which engage the flat sides, respectively, of resistor 18, suitable spring means (not shown) serving to clamp the elements 34 and 36 against resistor 18.

A flat bimetallic strip 42 is attached at one end to element 34 by rivets or the like to lie adjacent to element 34 in heat-exchanging relation therewith, as well as resistor element 18. As resistor element 18 heats up, element 34 also heats causing the opposite free end of strip 42 to move outwardly toward the dot-dash position indicated at 42'.

Figure 2A:
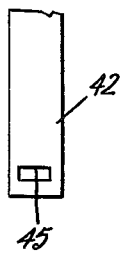
FIG. 2a is a fragmentary view of a part of the device of FIG. 2.
Figure 3:
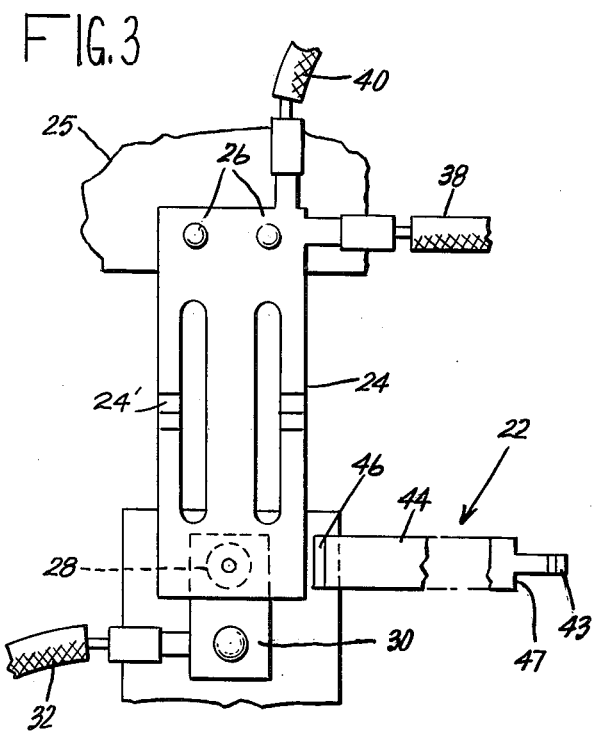
FIG. 3 is a plan view looking down on top of the overload switch in FIG. 2.

Loosely or pivotally connected to the free end of bimetallic strip 42 is a flat link or bar 44 which has an upturned end portion 46 adjacent the edge of bimetallic strip 24 of the overload switch. The link or bar 42, which is flat and elongated, is supported in a horizontal position by means of a reduced width tip portion 43 (FIGS. 2 and 3) thereon received by an aperture 45 (FIGS. 2 and 2a) in the end portion of strip 45, the tip portion 43 forming a transverse shoulder 47 with the bar 44, which engages the side of bar 42. Hanging freely, the bar 44 normally assumes a horizontal position. To further retain the connection, the tip portion 43 may be bent upwardly for loose engagement with the back side (right as viewed in FIG. 2) of strip 42 thereby limiting the downward movement of bar 44. Alternatively, stationary partition 48 with a suitable slot 49 may loosely receive the bar 44 for free sliding, longitudinal movement to hold the bar 44 horizontal and against lateral displacement. Further, to assure proper positioning of the bar 44, the left end slidably rides on horizontal surface 25a of a part 25b of the stationary supporting frame 25 for the total assembly. When the overload switch opens and the end of arm 24 thereof carrying contact 28 moves to the dot-dash position indicated at 24' in FIG. 2, if resistor element 18 is heated sufficiently to bend strip 42 to move bar 44 longitudinally to the left, the end portion 46 thereof will move to the dot-dash position indicated at 46' in FIG. 2 underneath the end of arm 24 to block the closing of the overload switch contacts 28 and 30. The end portion 46 is thus wedged between surface 25a and arm 24 to block closing of the switch contacts 28 and 30.

With the motor thus disconnected from the power lines, as soon as resistor element 18 cools down to a predetermined temperature, the strip 42, having sufficient spring strength to overcome the frictional blocking engagement with the arm 24, will return to its full line position with drawing member 44 and end 46 from under arm 24 whereupon cooled arm 24 can flex downwardly to close switch contacts 28 and 30 and, at this time, the motor will restart. It will be apparent that by thus blocking the overload switch 28, 30 from closing after it has opened, the repeated closing and opening of the overload switch 28, 30 due to failure of the starting winding to receive adequate current is prevented. It is insured that the resistor element 18 will be cooled down to such a point that the supply of current to the starting winding will be adequate to provide the motor with strong starting torque when the overload switch 28, 30 again closes.

The bimetallic arm 24 cooled to ambient temperature is preformed to close switch contacts 28 and 30. Bimetallic strip 42 also cooled to ambient temperature is preformed to lie adjacent to contactor 34 so that upon heating will flex outwardly therefrom, thus providing the action just described.

Such considerations, as previously mentioned, can be particularly important in respect of a device such as a refrigerator. If power is, for example, temporarily interrupted to a refrigerator, the motor stops, and a resumption of the power supply to the motor will, if the resistor element in the starting winding circuit is still heated, result in opening of the overload switch. Thereafter, in a system according to the present invention, sufficient time delay will occur to permit the resistor element 18 to cool down to a desired temperature while also permitting pressures in the refrigeration system to balance so that the motor can be started under conditions of lesser load than would otherwise be the case.

It will be apparent that a high temperature coefficient resistor element 18 and the overload switch 28, 30 can be physically separated so that substantially no heat exchange therebetween exists and this prevents either from influencing the operation of the other except by way of the mechanical connection therebetween which has been described. If more thermal isolation of the components from one another is required, a heat barrier in the form of an insulating partition 48 can be placed therebetween.

Figure 4:
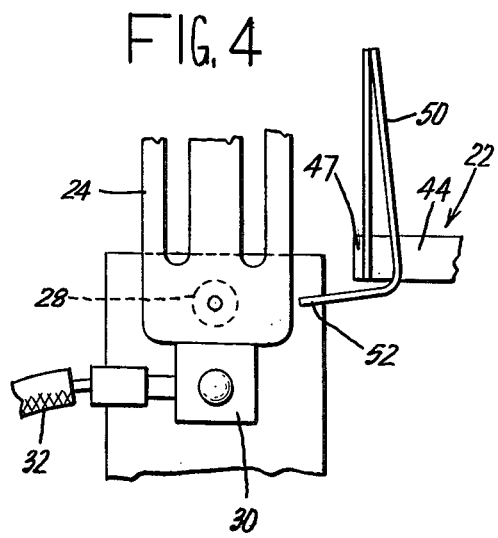
FIG. 4 is a fragmentary view showing the incorporation of a pressure limiting spring arrangement between the movable part of the overload switch and a blocking member therefor.

It will be apparent that the bimetallic element 42 associated with resistor element 18 will bias link 44 leftwardly to engage end or blocking member 46 with the edge of strip 24 whenever the motor is operating. This can lead to a greater force between the end portion or blocking member 46 and bimetal strip 24 on the overload switch than is desirable for free movement of the contact end of strip 24. The force referred to can be reduced by the arrangement shown in FIG. 4 in which a leaf spring 50 extending roughly parallel to strip 24 is provided having one end connected to an end portion 47 of link 44 and having the other end portion bent off as at 52 to form the blocking member, per se. In the FIG. 4 arrangement, the force with which the blocking member 52 engages the edge of bimetallic strip 24 is limited to a predetermined relatively small amount while the blocking function is not in any way interfered with, the member 52 being normally biased to move beneath strip 24 when bimetal 42 is heated by resistor element 18 for normal motor operation. The strength of spring 50 is subject to overcome the friction of blocking engagement with the strip 24 when bimetal 42 cools down.

Figure 5:
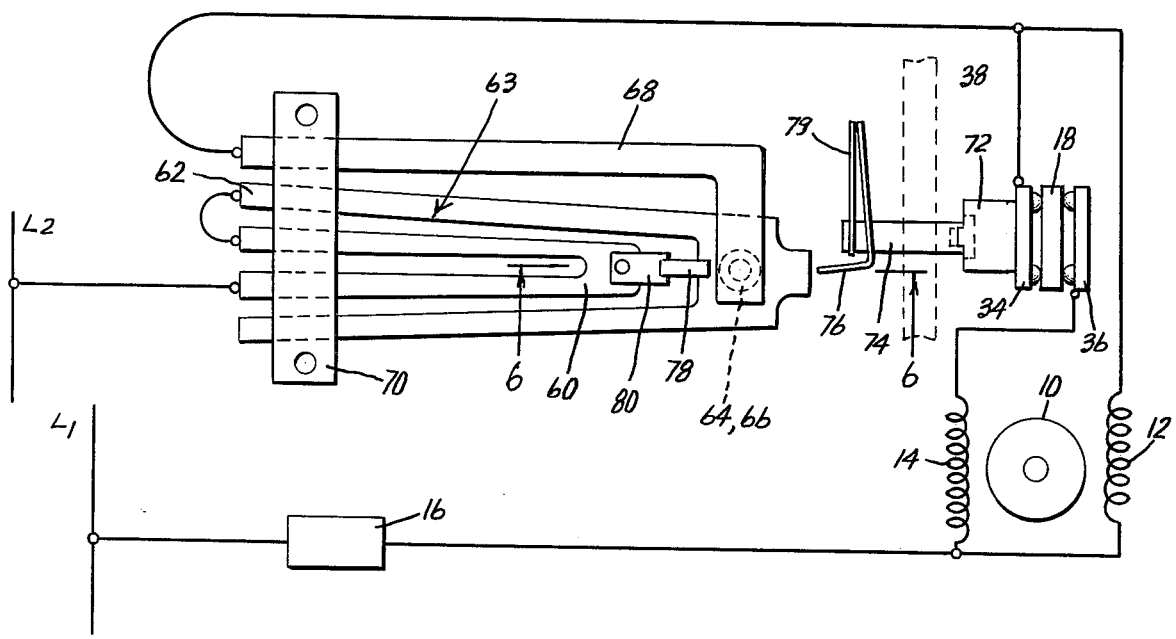
FIG. 5 is a view showing a snap action overload switch in the motor control circuit.
Figure 6:
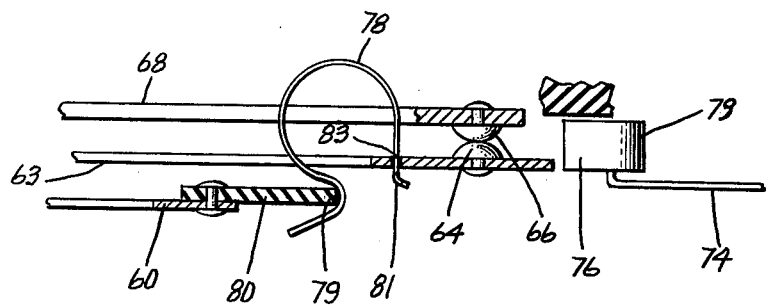
FIG. 6 is a partial sectional view indicated by line 6—6 on FIG. 5 and showing the movable portion of the overload switch in the blocking member therefor.

FIGS. 5 and 6 show how a snap action overload switch can be constructed to practice the present invention. In FIG. 5, a bimetal strip 60 is provided for the overload switch and is in the form of a U-shaped element with the supply of electric power being connected to one of the legs thereof. The other leg of the bimetallic strip 60 is electrically connected to a leg 62 of U-shaped contact member 63 which, as will best be seen in FIG. 6, carries a contact 64. The contact 64 is adapted for engagement with a contact 66 carried on a support arm 68. The aforementioned arm 68, contact member 63 and bimetallic strip 60, are fixedly clamped at one end in support block means 70 which may consist, for example, of a stack of strips of electrical insulation mounted on the switch frame.

The arm 68 is connected to one end of running winding 12 of the motor.

The starting winding 14 is, as before, connected in circuit with a high positive temperature coefficient resistor element 18 and which, as before, has a bimetallic strip 72 in heat exchange relation therewith which moves a link 74 longitudinally to which is connected a blocking member 76 by means of leaf spring 78 so that the blocking member 76 will block the movement of the member 63 downwardly in closing direction once the overload switch has opened in the manner explained hereinabove.

The snap action of the switch is obtained by the use of a generally C-shaped spring 78 which is connected between an insulating member 80 mounted on the end of the bimetal strip 60 and the contact carrying member 63. This connection is provided by engagement between bight 79 of spring 78 and the distal end of insulating member 80 and loose engagement of a tip portion 81 on the other end of spring 78 with an aperture in contact member 63, the tip portion 81 forming a shoulder 83 on spring 78 which engages the upper surface of contact member 63. As is well known, member 63 will snap between contact closed and contact open positions as bimetal strip 60 bends due to heating and cooling thereof.

With the motor energized and running normally, the blocking member 76 is biased into engagement with the adjacent end edge of contact member 63. Should an overload occur which causes bimetal 60 to snap contacts 64 and 66 open, blocking member 76 will spring to a position over contact member 63 preventing closure of contacts 64, 66. When the motor has been "off" a sufficient period of time to permit the resistor element 18 and bimetal 74 to cool and retract blocking member 76 from contact member 63, switch contacts 64, 66 will close due to the cooling of bimetal 60 which causes contact member 63 to toggle upwardly.

It will be seen that the means for operating the motor overload contacts 28, 30 of FIG. 2 and 64 and 66 of FIG. 6 are thermally isolated from the resistor 18 such that the heat generated by resistor 18 does not directly cause the opening and closing of the contacts except through the intermediary of the mechanical interlocks 46, 52 and 76.

While there have been described above the principles of this invention in connection with specific apparatus, it is to be clearly understood that this description is made only by way of example and not as a limitation to the scope of the invention.

What is claimed is:

1. An electric motor control circuit, especially for split phase motors having starting and running windings in respective parallel branches, said circuit comprising; a positive temperature coefficient resistor element in the starting winding branch, a switch having normally closed separable contacts in series with both branches, motor load sensitive means in circuit with at least said running winding and operable at a predetermined motor load to move said contacts to open position, and control means operable when said resistor element is above a predetermined temperature to prevent said switch contacts from closing after having been actuated into open position thereof.

2. An electric motor control circuit according to claim 1 in which said load sensitive means comprises bimetallic means through which the motor current flows.

3. An electric motor control circuit according to claim 1 in which said motor load sensitive means includes a movable support carrying one of said contacts and further includes a toggle arm and over center spring means engaging the arm for snapping said contacts between open and closed positions, and said motor load sensitive means further comprising bimetallic means having a movable portion operatively engaging said spring means to actuate said spring means and in circuit with the motor.

4. An electric motor control circuit according to claim 1 in which said control means comprises means sensitive to the temperature of said resistor element and a member movable thereby at a predetermined temperature of said resistor element into position to block closure of said contacts after opening thereof.

5. An electric motor control circuit according to claim 4 in which said control means includes a bimetallic actuator in heat exchange relation with said resistor element and having a movable portion connected to said member and urging said member toward support blocking position in response to a predetermined increase in temperature of said resistor element and to unblocking position in response to a predetermined reduction in temperature thereof.

6. An electric motor control circuit according to claim 1 in which said control means comprises means sensitive to the temperature of said resistor element and a member movable thereby at a predetermined temperature of said resistor element into position to block said contacts from moving from open to closed position, a bimetallic actuator in heat exchange relation with said resistor element and having a movable portion connected to said member and urging said member toward contact-blocking position in response to a predetermined increase in temperature of said resistor element, and resilient means in the connection of said member to said bimetallic means to limit the force of operative engagement of said member with at least one of said contacts when said resistor element increases in temperature while said switch contacts are closed.

7. An electric motor control circuit according to claim 3 in which said control means includes bimetallic means in heat exchange relation with said resistor element and having a movable portion, a link connected to said portion to be actuated thereby, and a spring connected to the link and movable thereby into position to block said arm when the latter is in contact open position, said link urging said spring toward arm blocking position when said resistor element is above a predetermined temperature.

8. An electric motor control circuit according to claim 1 in which said switch contacts are in series with both of the windings so opening of the switch contacts will interrupt the supply of electrical energy to both windings.

9. An electric motor control circuit according to claim 1 which includes heat barrier means interposed between said switch and said resistor element.

10. The method of operating a split phase electric motor which comprises the circuit of a high temperature coefficient resistor element in series with the starting winding of the motor, a motor running winding in parallel with the serially connected starting winding and resistor element, a normally closed motor load sensitive switch in series with both windings of the motor, the steps comprising opening of said switch when motor overload occurs, urging said switch to closed position following the opening thereof, preventing closing of said switch from open position when said resistor element is above a predetermined temperature, and permitting closure of said switch when said temperature decreases to a predetermined level.

11. The method according to claim 10 in which said switch is mechanically prevented from closing.

12. An electric motor control device comprising a switch having first and second normally closed contacts, first means for opening said contacts in response to predetermined current flow therebetween, a positive temperature coefficient resistor in circuit with said contacts, second means in heat-exchanging relation with said resistor for holding said contacts open in response to a predetermined increase in temperature of said resistor after said first means has opened said contacts, said first and second means being thermally isolated.

13. The device of claim 12 in which said first means is a first bimetallic strip that conductively carries one of said contacts and which opens said contacts in response to said predetermined current.

14. The device of claim 13 in which said second means includes a member movable into a first position which operatively holds said contacts separated and in a second position which releases said hold, a bimetallic element in heat-exchanging relation with said resistor responsive to different predetermined temperatures thereof to move said member between said first and second positions.

15. The device of claim 14 in which said first bimetallic strip is secured to a stationary support at one end and carries its contact on the other end, said member carries a blocking element thereon engageable with an edge of said strip, said member being movable in a plane generally parallel to that of said strip, said bimetallic element being elongated and operatively secured at one end to said resistor with the other end operatively connected to said member whereby flexure of said bimetallic element in response to temperature changes in said resistor causes the aforesaid movement of said member, said member in its first position locating said blocking element in interfering alignment with the contact side of said bimetallic strip thereby to prevent closure of said contacts.

16. The device of claim 15 in which said bimetallic strip and said contacts are electrically connected in series with said resistor.

* * * * *